(12) United States Patent
Asahara

(10) Patent No.: US 9,989,959 B2
(45) Date of Patent: Jun. 5, 2018

(54) WORKPIECE PROCESSING SYSTEM FOR CARRYING OUT SEQUENTIAL EXECUTION OF PROCESS OF WORKPIECE IN EACH PROCESS CHAMBER BY SETTING START TIME OF PROCESS IN EACH PROCESS CHAMBER BASED ON NECESSARY PROCESSING DURATION SPECIFIC TO EACH CHAMBER AND NECESSARY CONVEYANCE DURATION BETWEEN THE CHAMBERS

(71) Applicant: TOYOTA JIDOSHA KABUSHIKI KAISHA, Toyota-shi, Aichi (JP)

(72) Inventor: Seiichi Asahara, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 306 days.

(21) Appl. No.: 15/017,929

(22) Filed: Feb. 8, 2016

(65) Prior Publication Data

US 2016/0266575 A1 Sep. 15, 2016

(30) Foreign Application Priority Data

Mar. 10, 2015 (JP) ................................. 2015-047032

(51) Int. Cl.
 *G06F 19/00* (2018.01)
 *G05B 19/418* (2006.01)
(52) U.S. Cl.
 CPC ... *G05B 19/4189* (2013.01); *G05B 19/41865* (2013.01); *G05B 2219/32271* (2013.01);
 (Continued)

(58) Field of Classification Search
 CPC .......... G05B 19/41865; G05B 19/4189; G05B 2219/32271; G05B 2219/32306; G05B 2219/45054; Y02P 90/20; Y02P 90/28
 See application file for complete search history.

(56) References Cited

U.S. PATENT DOCUMENTS 5,868,871 A 2/1999 Yokose et al.
2006/0155412 A1 7/2006 Ikeda

FOREIGN PATENT DOCUMENTS

CN 1812051 A 8/2006
JP 08226775 A 9/1996
(Continued)

*Primary Examiner* — Thomas Lee
*Assistant Examiner* — Zhipeng Wang
(74) *Attorney, Agent, or Firm* — Sughrue Mion, PLLC

(57) ABSTRACT

A workpiece processing system and method to process a workpiece in processing chambers in order, in which even if processing duration varies at any chamber, such a variation does not affect the processing of the workpiece in other chambers. Each chamber performs processing of a workpiece in a predetermined order; a conveyor that conveys a workpiece to a next chamber; and a control device controls at least a start time of predetermined processing at each processing chamber. The control device sets: predetermined representative processing at a first chamber as a reference processing step, start time of the reference processing step as control start time, necessary processing duration specific to each chamber, necessary conveyance duration required to convey a workpiece between the chambers, and controls starting of the representative processing at each chamber while considering the control start time as origination.

1 Claim, 8 Drawing Sheets

(52) U.S. Cl.
CPC .............. *G05B 2219/32306* (2013.01); *G05B 2219/45054* (2013.01); *Y02P 90/20* (2015.11); *Y02P 90/28* (2015.11)

(56) References Cited

FOREIGN PATENT DOCUMENTS

| | | |
|---|---|---|
| JP | 10-053809 A | 2/1998 |
| JP | 1067539 A | 3/1998 |
| JP | 2001-220659 A | 8/2001 |
| JP | 2002235163 A | 8/2002 |

WORKPIECE PROCESSING SYSTEM FOR CARRYING OUT SEQUENTIAL EXECUTION OF PROCESS OF WORKPIECE IN EACH PROCESS CHAMBER BY SETTING START TIME OF PROCESS IN EACH PROCESS CHAMBER BASED ON NECESSARY PROCESSING DURATION SPECIFIC TO EACH CHAMBER AND NECESSARY CONVEYANCE DURATION BETWEEN THE CHAMBERS

CLAIM OF PRIORITY

The present application claims priority from Japanese patent application JP 2015-047032 filed on Mar. 10, 2015, the content of which is hereby incorporated by reference into this application.

BACKGROUND

Technical Field

The present invention relates to a workpiece processing system and processing method.

Background Art

Various methods for processing workpieces are available, and when a workpiece is to be carburized, for example, the workpiece moves through a plurality of processing chambers in order, and in these processing chambers, various types of control is performed to the workpiece, such as moving of the workpiece straight ahead or rotating the workpiece by an actuator, or varying pressure in a processing chamber from vacuum atmosphere to high-pressure atmosphere.

Each workpiece is conveyed through a plurality of processing chambers in accordance with the predetermined conveying order for workpieces, and a workpiece subjected to the processing in a processing chamber is conveyed to the next processing chamber by a conveyor for the processing in the next processing chamber. In this way, the workpiece undergoes processing in the plurality of processing chambers, whereby it is processed as a semifinished product or a finished product.

Conventionally when a workpiece is processed while being conveyed through such a plurality of processing chambers in order, if the processing duration of the workpiece in each processing chamber changes from desired duration, the workpiece is processed while shifting the timing to convey the workpiece to the next processing chamber by such a changed processing duration.

Therefore if the processing of the workpiece in each processing chamber takes time more than the desired duration, the cumulative duration that is the summation of the exceeded durations will be standby time at the following processing chambers. Conversely if the processing duration of the workpiece in a processing chamber is shorter than the desired processing duration, the process start time at the following processing chambers will be advanced.

In this way, the processing duration is managed for each processing chamber, and so a change in the processing duration of a processing chamber causes a change in the process start time in other processing chambers, which may cause problems, such as a variation in stand-by time at the other processing chambers or insufficient time for preparation there.

For instance, a variation in stand-by time at the processing chambers means a variation in the amount of heat dissipation from the workpiece after heat treatment at a processing chamber, and so all of a plurality of workpieces to be processed cannot be controlled uniformly about the temperature, resulting in instable quality of the workpieces. Such a problem will be remarkable in the case of a heat treatment at high temperatures, such as rapid carburizing processing where the workpieces are processed under high-temperature atmosphere at about 1,100° C., for example.

Further, if processing duration at each processing chamber is changed, and such a temporal change is cumulated, then the processing at the following processing chambers cannot be performed in some cases. Especially in the case of a high-cycle operation, it is essential for the cyclic operation to follow the processing time in the units of seconds, and so the possibility to stop operation cannot be denied.

Patent Document 1 discloses a method and apparatus for carburizing, quenching and tempering, in which one preheating chamber, six carburizing chambers, a cooling chamber, a reheating chamber, a quenching chamber and a tempering chamber are disposed around an intermediate chamber having a conveyance unit, each of major processing chambers is heated by high-frequency induction heating. Plasma carburizing is performed in the carburizing chambers, and workpieces conveyed from a machining and manufacturing line one by one are distributed to each of the processing chambers for carburizing, quenching and tempering.

According to the method and apparatus disclosed in Patent Document 1, carburizing can be performed in accordance with the supplying speed from the machining and manufacturing line without stopping the flow of the machining and manufacturing line. However, a workpiece preheated at the preheating chamber, for example, will be held at the carburizing temperature in the preheating chamber until the intermediate chamber or the carburizing chamber become vacant, and so if a variation occurs in the processing time at the carburizing step or the following steps, the workpieces are highly likely not to be processed in a scheduled cycle time.

RELATED ART DOCUMENT

Patent Document

Patent Document 1: JP H10-53809 A

SUMMARY

In view of the problems as stated above, the present invention aims to provide a workpiece processing system and processing method to process a workpiece in a plurality of processing chambers in order, in which even if processing duration varies at any processing chamber, such a variation does not affect the processing of the workpiece in other processing chambers.

In order to fulfill the aim, a workpiece processing system according to the present invention includes: a plurality of processing chambers each of which performs processing of a workpiece in accordance with a predetermined order; a conveyor that conveys a workpiece subjected to processing at a predetermined processing chamber to a next processing chamber; and a control device that controls at least start time of predetermined representative processing among various types of processing performed at each processing chamber. The control device sets predetermined representative processing at a first processing chamber that performs first processing as a reference processing step, sets start time of the reference processing step as control start time, sets necessary processing duration specific to each processing chamber, sets necessary conveyance duration required to convey a workpiece between the processing chambers, and controls starting of the representative processing at each processing chamber while considering the control start time as origination.

The workpiece processing system according to the present invention includes a plurality of processing chambers each of which performs processing of a workpiece in order, and a control device that controls the timing of processing of a workpiece at each processing chamber. The control device sets predetermined representative processing at a processing chamber that performs first processing as a reference processing step, and controls the timing of processing at each processing chamber while considering the start time of the reference processing step as origination. This allows, even when a variation occurs in processing duration in a processing chamber, the workpiece to be processed at each processing chamber at the preset timing.

To the control device, the start time of the reference processing step, the necessary processing duration specific to each processing chamber and the necessary conveyance duration required to convey a workpiece between processing chambers are input.

Herein, the "representative processing" at a processing chamber includes opening of the door of the processing chamber, transferring of a workpiece to the processing table in the processing chamber and the like, which are steps specific to the processing chamber. Among them, when opening of the door is set as the representative processing for every processing chamber, then this can facilitate the control and management of all of the processing chambers.

At each processing chamber, processing specific thereto is performed, and various types of control are performed in the processing chamber for processing. For instance, in the case of a vacuum heat-treatment chamber, the processing chamber is provided with a vacuum pump and a heating device, such as a heater, and control to make the interior of the chamber vacuum atmosphere by the vacuum pump and control to heat a workpiece through the operation of the heating device are performed at the timing specific thereto. Then, aside from such processing of the workpiece in the chamber, opening of the door of the processing chamber is performed, for example, and the start time of the "opening the door" to convey the workpiece in the processing chamber is set beforehand on the basis of the start time of the predetermined representative processing (reference processing step) at the first processing chamber that performs the first processing among the plurality of processing chambers.

For instance, when the system includes N processing chambers including a first processing chamber, a second processing chamber, . . . a N-th processing chamber in the processing order, the necessary processing duration specific to each processing chamber and the necessary conveyance duration required to convey a workpiece between the processing chambers, which are input and stored in the control device, are added to the start time of the reference processing step (e.g., opening the door at the first processing chamber) at the first processing chamber, whereby door-opening time at the second processing chamber, door-opening time at the third processing chamber, and the like can be set.

The necessary processing duration at each processing chamber can be set based on empirical rules or experimental operations, and the same applies to setting of the necessary conveyance duration required to convey a workpiece between the processing chambers.

Herein the necessary processing duration is desirably a maximum duration including a variation in duration required for processing at a processing chamber among durations required for the processing.

The "maximum duration including a variation in duration required for processing" means a maximum required duration that is selected from a plurality of estimated processing durations that are determined for a target processing chamber based on empirical rules or experimental operations, or may be a required duration obtained by cumulating a temporal error estimated for each processing step in the processing chamber and adding the cumulated temporal error to the standard processing duration.

Such a maximum duration is set for the necessary processing duration at a processing chamber among the necessary processing durations that can be estimated, whereby even when an error occurs to some extent in the processing duration at any processing chamber, such an error does not affect the start time of the representative processing at the other processing chambers. Therefore, the control specific to each processing chamber can be performed at the set start time, and so problems, such that errors in the processing duration at the processing chambers that are added lead to a failure to perform the processing at the following processing chambers, can be addressed.

In the case where such a maximum duration is set as the necessary processing duration at each processing chamber, the case where the processing at the preceding processing chamber ends earlier can be dealt with as follows. That is, in such a case, the representative processing at the next processing chamber may be performed at the originally set time, i.e., stand-by of a workpiece until the time is permitted in this case.

In a preferable embodiment of the workpiece processing system according to the present invention, the system further includes a warning device, and the control device monitors whether, at start time of the representative processing of each processing chamber, the representative processing can be performed or not, and if the control device determines that the representative processing cannot be performed, the control device transmits, to the warning device, an instruction to output abnormality warning.

If a certain processing chamber is not ready to accept a workpiece at the start time of the representative processing, then even when the processing chamber opens the door and accepts the workpiece, the processing of the workpiece cannot be performed within the necessary processing duration. In such a case, the workpiece will be conveyed to the door of the next processing chamber after the time to open the door.

Then, the control device is configured to monitor, at the processing end time of a processing chamber, whether the processing of the workpiece at the processing chamber ends or not, or to monitor, at the door opening time of a processing chamber, whether the workpiece waits at a conveyable position to the processing chamber or not.

Herein, one embodiment of the monitoring by the control device includes imaging a workpiece by a monitor that can monitor the area where the representative processing is to be performed, transmitting the image to the control device, and monitoring whether the representative processing can be performed or not at the processing chamber on the basis of a result of the transmission, for example.

If the control device determines that the representative processing cannot be performed, an instruction to output abnormality warning from the warning device is transmitted from the control device to the warning device, whereby the abnormal processing chamber can be found quickly, and so the operation to recover such a processing chamber can be performed rapidly.

The conveyor making up the processing system as stated above may convey a workpiece not only between the processing chambers but also in a processing chamber.

The conveyor includes various types of devices, such as a conveyance robot that moves between the processing chambers, and a self-propelled conveying chamber that conveys a workpiece while storing the workpiece in the chamber.

The conveyor is not limited to the form of conveying a workpiece between processing chambers simply, which may be in the form of conveying a workpiece to various parts in a processing chamber as well.

Processing of a workpiece in each processing chamber includes various types of processing, such as various types of heat treatment, surface treatment, carburizing treatment, nitriding treatment and shot-peening treatment. A workpiece also may be of various types, such as automobile components and electrical appliance components. The system may have various configurations, in which one processing step may include a plurality of lines or a plurality of conveyors may be disposed.

The present invention relates to a workpiece processing method as well. This processing method is to process a workpiece while conveying the workpiece among a plurality of processing chambers each of which performs processing of the workpiece in accordance with a predetermined order, and includes a first step of setting predetermined representative processing at a first processing chamber that performs first processing as a reference processing step, setting start time of the reference processing step as control start time, setting necessary processing duration specific to each processing chamber, setting necessary conveyance duration required to convey the workpiece between the processing chambers, and setting starting time of representative processing at each processing chamber while considering the control start time as origination; and a second step of performing processing of the workpiece at each processing chamber in accordance with the start time of the representative processing set for each processing chamber.

In this processing method as well, the necessary processing duration is preferably a maximum duration including a variation in duration required for processing at a processing chamber among durations required for the processing.

Preferably in the second step, if the representative processing at each processing chamber cannot be performed, abnormality warning is issued.

As can be understood from the above descriptions, according to the workpiece processing system and processing method of the present invention, when a workpiece is processed through a plurality of processing chambers in order, predetermined representative processing at a processing chamber that performs first processing is set as a reference processing step, and start time of the representative processing at the other processing chambers is set while considering the start time of the reference processing step as the origination, and then the processing of the workpiece at the processing chambers is performed in order. Thereby even if processing duration varies at any processing chamber, the workpiece can be processed at the other processing chambers at the preset start time (timing).

DETAILED DESCRIPTION OF THE EMBODIMENTS

The following describes embodiments of a processing system and processing method for workpieces of the present invention, with reference to the drawings. In the illustrated examples, the processing system is provided with a warning device that issues warning if the processing cannot be performed at any one of the processing chambers, and the processing system may not be provided with such a warning device.

One Embodiment of a Processing System and Processing Method for Workpieces

Figure 1:
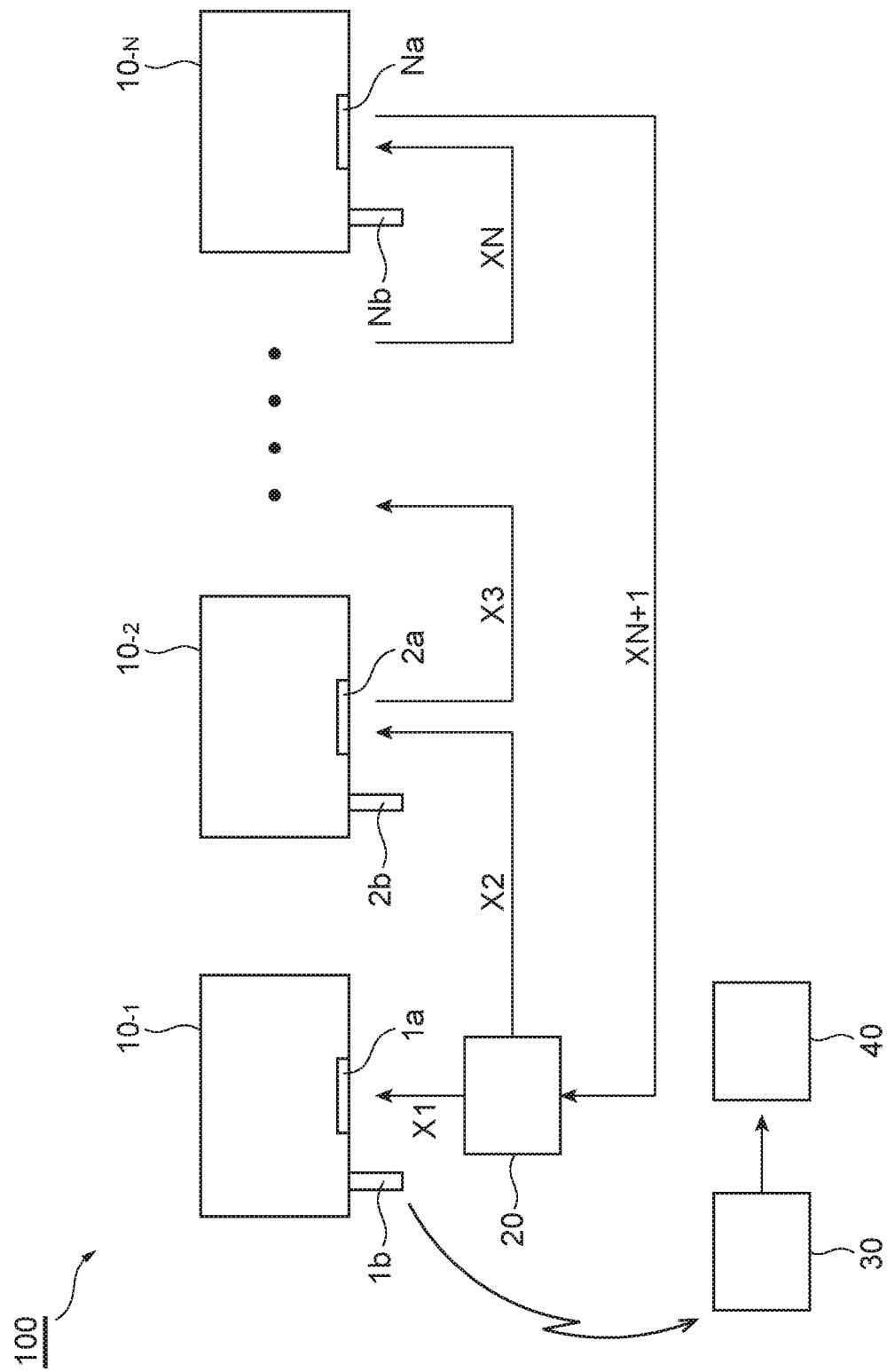
FIG. 1 schematically describes a workpiece processing system of the present invention.
Figure 2:
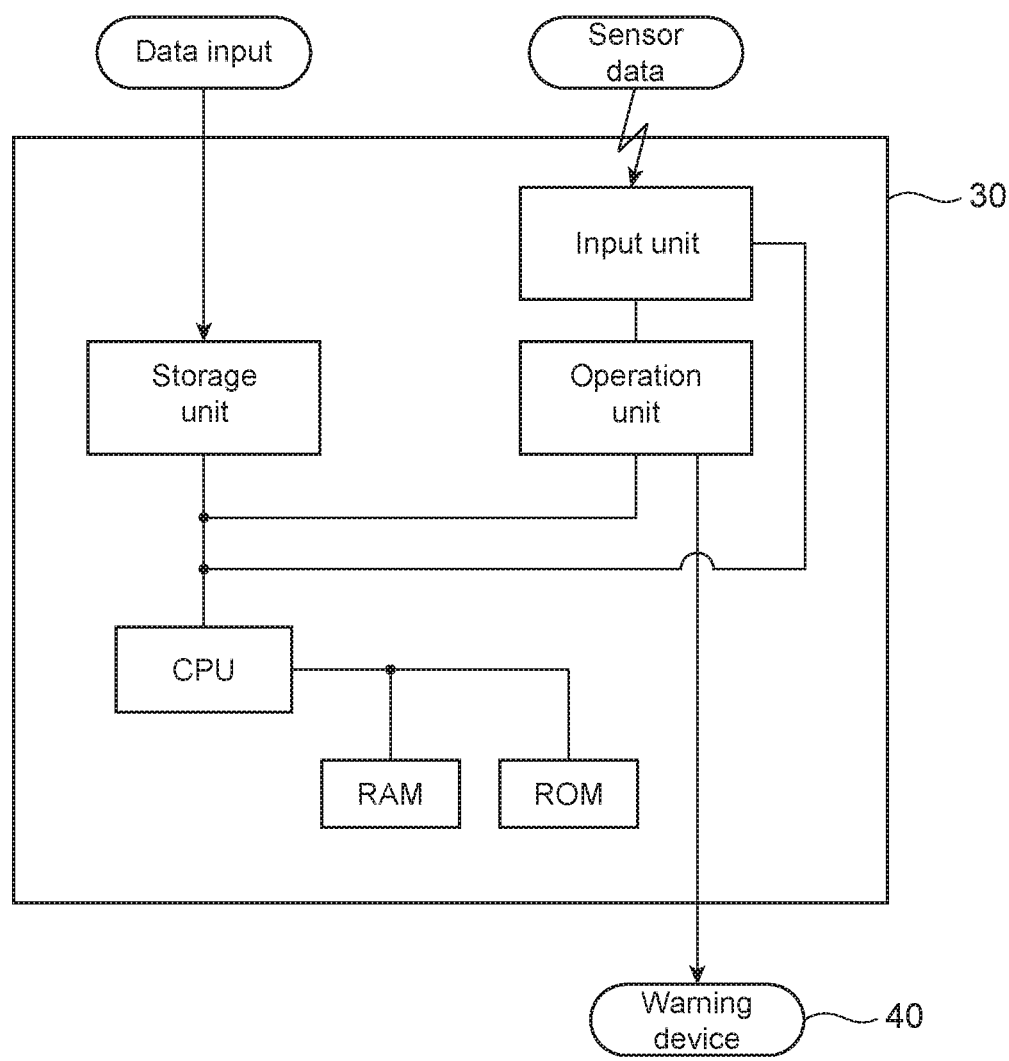
FIG. 2 is a block diagram of the internal structure of a control device.

FIG. 1 schematically describes a workpiece processing system of the present invention, and FIG. 2 is a block diagram of the internal structure of a control device. The illustrated processing system 100 for workpieces roughly includes a plurality (N) processing chambers $10_{-1}$, $10_{-2}$, . . . $10_{-N}$, a conveyor 20 to convey a workpiece between the processing chambers, a control device 30 to control timing of the processing of the workpiece at each processing chamber 10, and a warning device 40 to issue warning if the processing at any one of the processing chambers 10 cannot be performed.

Each processing chamber 10 performs their specific processing, examples of which include various types of heat treatment, surface treatment, carburizing treatment, nitriding treatment and shot-peening treatment, and suitable processing is selected in accordance with the processing to be performed for the workpiece.

For the processing chambers $10_{-1}$, $10_{-2}$, . . . $10_{-N}$, the processing order of the workpieces is determined in this order.

The processing chambers $10_{-1}$, $10_{-2}$, . . . $10_{-N}$ include doors 1a, 2a, . . . Na for entrance and exit of workpieces, and sensors 1b, 2b, . . . Nb to detect the positioning of the conveyor 20 performed in front of the doors, respectively. The processing chambers 10 further include a delivery base to deliver a workpiece, a heating device to heat a workpiece, a rotating shaft that rotates with a workpiece placed thereon, while heating the workpiece by the heating device, a vacuum pump for vacuuming of the processing chamber and the like, as needed.

The conveyor 20 is self-propelled, and has a chamber structure to store a workpiece therein, and includes a fork to hold a workpiece and convey the workpiece from the conveyor 20 into a processing chamber 10, and receive the processed workpiece in the processing chamber 10 and store the workpiece in the conveyor 20. The processing chambers 10 also include a vacuuming pump for vacuuming of the chamber as needed.

The conveyor 20 storing a workpiece therein moves among the processing chambers $10_{-1}$, $10_{-2}$, ... $10_{-N}$ in order. Firstly, the conveyor 20 moves to the front of the door 1a of the first processing chamber $10_{-1}$ and is positioned (X1 direction), and when preparation for the processing in the processing chamber $10_{-1}$ is completed and the door 1a is opened, then the workpiece is delivered from the conveyor 20 into the processing chamber $10_{-1}$. When predetermined processing is performed to the workpiece in the processing chamber $10_{-1}$, then the workpiece after the processing is delivered to the conveyor 20, and the conveyor 20 moves to the next processing chamber $10_{-2}$ (X2 direction). Subsequently a similar operation is repeated until the final processing chamber $10_{-N}$ (the conveyor 20 then moves in the X3 direction ... XN direction).

When the processing of the workpiece ends at the final processing chamber $10_{-N}$, the conveyor 20 returns to the first processing chamber $10_{-1}$ (XN+1 direction), and when the next workpiece is to be processed similarly, a similar repeating processing is performed. Note here that the conveyor 20 is not limited to one device that conveys a workpiece from the first processing chamber $10_{-1}$ to the final processing chamber $10_{-N}$, which may include a plurality of conveyors to share the conveying among the processing chambers 10.

As illustrated in FIG. 1, when the conveyor 20 is positioned in front of the door of the processing chamber $10_{-1}$, the sensor 1b including a CCD camera, for example, detects the conveyor, and such detection information is transmitted to the control device 30. Instead of using the sensor 1b, when the conveyor 20 is docked to the processing chamber $10_{-1}$, such docking information may be automatically transmitted to the control device 30.

Herein as illustrated in FIG. 2, the control device 30 at least internally includes a storage unit that stores input information including input data, an input unit into which information transmitted from sensors is input, a operation unit that performs various operations on the basis of information stored in the storage unit and the input unit, and a CPU, a RAM and a ROM that perform processing of these units, and these units are connected via a bus.

In the processing system 100, predetermined representative processing in the first processing chamber $10_{-1}$ that performs the first processing is a reference processing step, and the start time of the reference processing step is set as control start time. Then, necessary processing duration specific to each processing chamber 10 is set, necessary conveyance duration required to convey a workpiece between the processing chambers 10 is set, and start time for representative processing at each processing chamber 10 is set while setting the control start time as the origination. Then, the processing of a workpiece is controlled at each processing chamber 10 so that representative processing is performed at the start time of the representative processing set for each processing chamber 10.

To the storage part of the control device 30, the start time of the reference processing step, the necessary processing duration specific to each processing chamber 10, and the necessary conveyance duration required to convey a workpiece between the processing chambers 10 are input for storing.

Note here that the necessary processing duration is set while considering a variation in duration required for the processing, and a maximum duration including such a variation is set among the durations required for the processing in the processing chamber. Specifically it may be a maximum required duration that is selected from a plurality of estimated processing durations that are determined for a target processing chamber 10 based on empirical rules or experimental operations, or may be a required duration obtained by cumulating a temporal error estimated for each processing step in the processing chamber 10 and adding the cumulated temporal error to the standard processing duration.

Based on the data stored in the storage unit, the operation unit operates start time of the representative processing at each processing chamber 10 while setting the control start time as the origination, and controls the processing at each processing chamber 10 based on the operated start time.

Herein if a certain processing chamber 10 is not ready to accept a workpiece at the start time of the representative processing, then even when the processing chamber 10 opens the door and accepts the workpiece, the processing of the workpiece cannot be performed within the necessary processing duration. In such a case, the workpiece will be conveyed to the door of the next processing chamber after the time to open the door.

Then, the operation unit of the control device 30 checks whether, at the door opening time of a processing chamber 10, stand-by information of the conveyor 20 is input to the input unit or not. Alternatively, the operation unit checks whether, at the processing end time of a processing chamber 10, the processing of the workpiece at the processing chamber 10 ends or not.

Then, if it is detected that the conveyor 20 is delayed from the door opening time of a processing chamber 10 or that the processing of a workpiece at a processing chamber 10 does not end at the processing end time of the processing chamber 10, the operation unit transmits an instruction signal to output abnormality warning from the warning device 40, and the warning device 40 issues abnormality warning.

Figure 3:
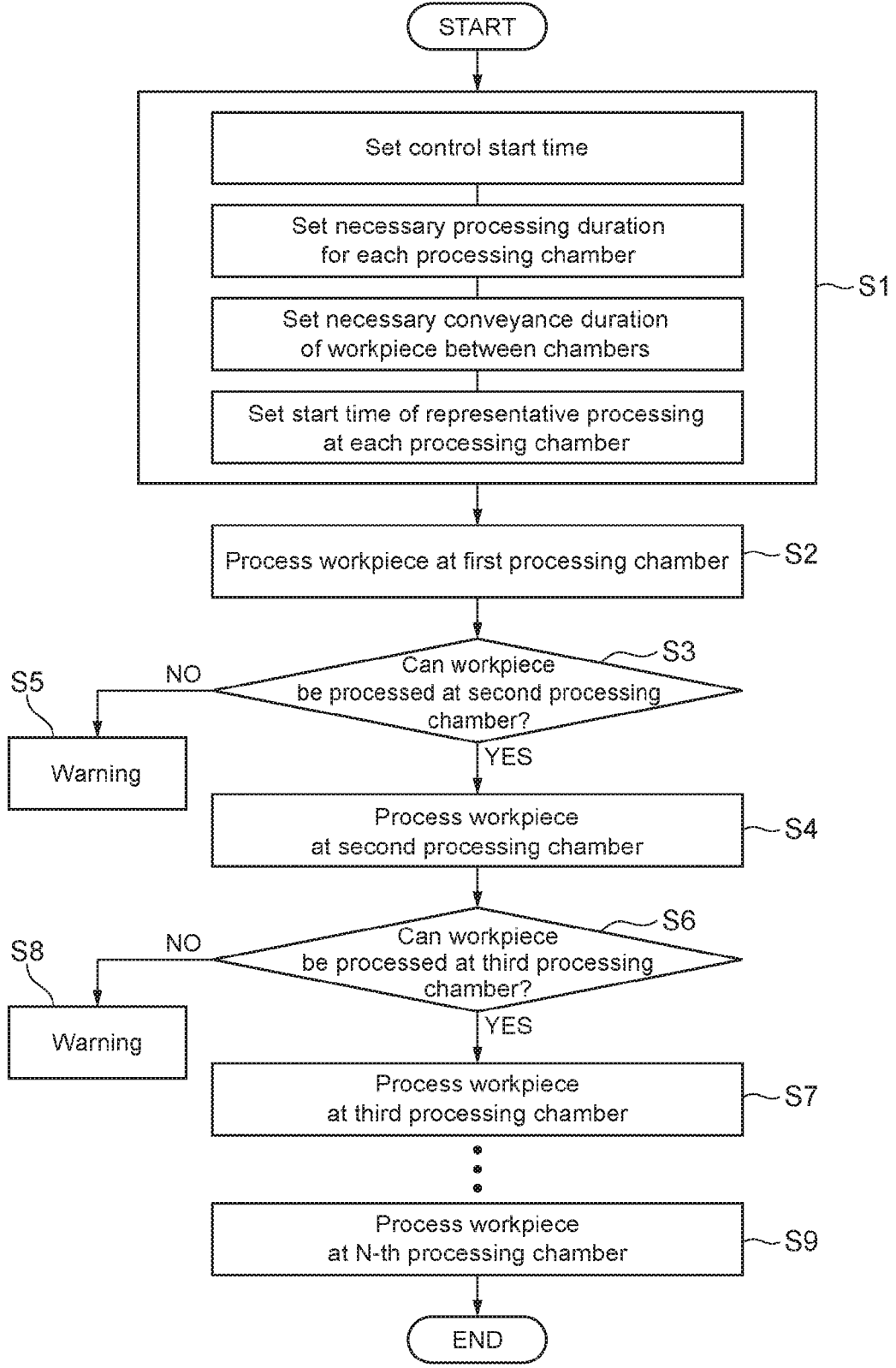
FIG. 3 is a flowchart to describe the control flow in the control device.

Referring now to the control flowchart of FIG. 3, the control by the control device as described above is described.

The control device 30 performs setting of the control start time, setting of the necessary processing duration for each processing chamber 10, and setting of the necessary conveyance duration of a workpiece between the processing chambers, and the control device 30 performs setting (operation) of start time of the representative processing at each processing chamber on the basis of such information (at Step S1, a first step of the workpiece processing method).

Herein, the representative processing for each processing chamber 10 is selected appropriately, and opening the door may be set as the representative processing for each processing chamber 10, for example, whereby starting of the processing or the processing duration in each processing chamber 10 can be controlled or managed easily.

Next, a workpiece is processed in the first processing chamber $10_{-1}$ (Step S2).

After the processing at the first processing chamber $10_{-1}$, the operation unit of the control device 30 determines whether the workpiece can be processed or not at the second processing chamber $10_{-2}$ (Step S3), and when it is determined that the workpiece can be processed, opening the door as the representative processing at the second processing chamber $10_{-2}$ is performed, and the workpiece is conveyed from the conveyor 20 to the second processing chamber $10_{-2}$ for the processing of the workpiece at the second processing chamber $10_{-2}$ (Step S4). On the contrary, when it is determined that the workpiece cannot be processed, an instruction signal for abnormality warning is transmitted to the warning device 40, from which warning indicating abnormality is issued (Step S5).

When abnormality warning is issued, the processing of the workpiece is stopped once, and the operator checks the cause of abnormality at the processing chamber 10 where the abnormality occurred, and tries to recover the state.

After the processing at the second processing chamber $10_{-2}$, the operation unit of the control device 30 determines whether the workpiece can be processed or not at third processing chamber $10_{-3}$ (Step S6), and when it is determined that the workpiece can be processed, opening the door as the representative processing at the third processing chamber $10_{-3}$ is performed, and the workpiece is conveyed from the conveyor 20 to the third processing chamber $10_{-3}$ for the processing of the workpiece at the third processing chamber $10_{-3}$ (Step S7). On the contrary, when it is determined that the workpiece cannot be processed, an instruction signal for abnormality warning is transmitted to the warning device 40, from which warning indicating abnormality is issued (Step S8).

Subsequently, similar operation is performed until the N-th processing chamber $10_{-N}$, and then the processing of the workpiece ends till the N-th processing chamber $10_{-N}$ (Step S9), whereby the entire processing ends. Herein, the processing from step S2 to step S9 is a second step of the workpiece processing method.

In this way, predetermined representative processing at the first processing chamber $10_{-1}$ that performs the first processing is set as a reference processing step, and start time of the reference processing step is set as control start time. Then, start time of representative processing at each processing chamber 10 is set based on this control start time, and the processing of the workpiece at the processing chamber 10 is performed with reference to the thus set start time of the representative processing. Therefore even when a variation occurs in the processing duration at any processing chamber 10, such a variation does not affect the processing at the following processing chambers 10. Especially, a maximum duration that can be estimated is set for the necessary processing duration for each processing chamber 10, whereby the representative processing at each processing chamber 10 can be performed at the predetermined start time more precisely.

Examples

Figure 4:
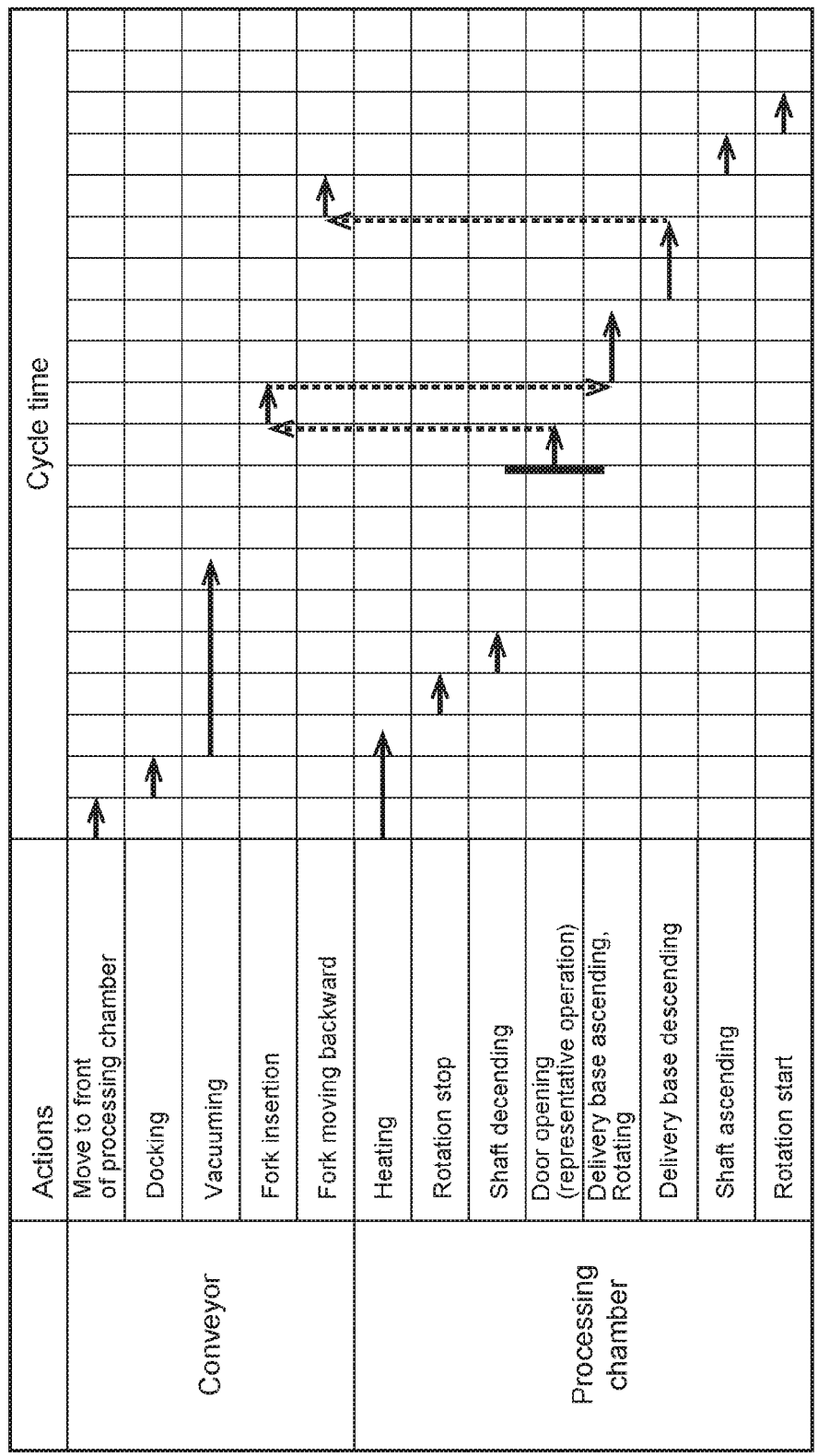
FIG. 4 illustrates an example of the processing flow in one processing chamber.
Figure 7A:
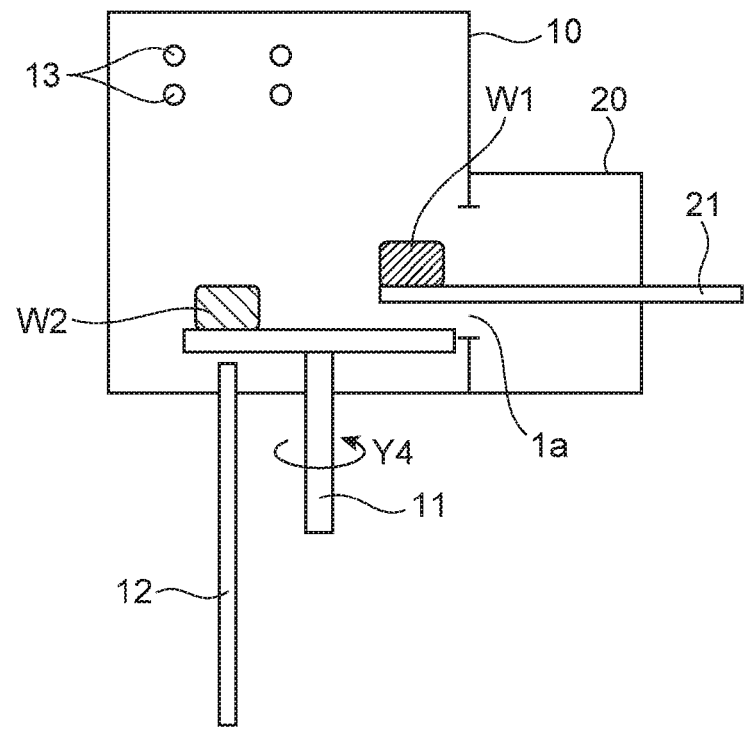
FIGS. 7A and 7B schematically describe, following FIGS. 6A and 6B, an example of the processing flow in the processing chamber in the order of FIGS. 7A and 7B.
Figure 7B:
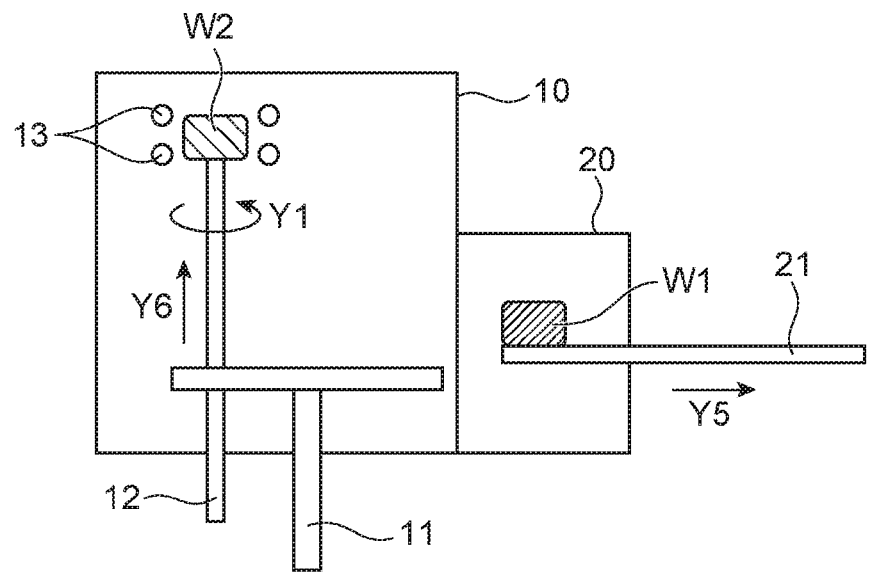
Figure 8:
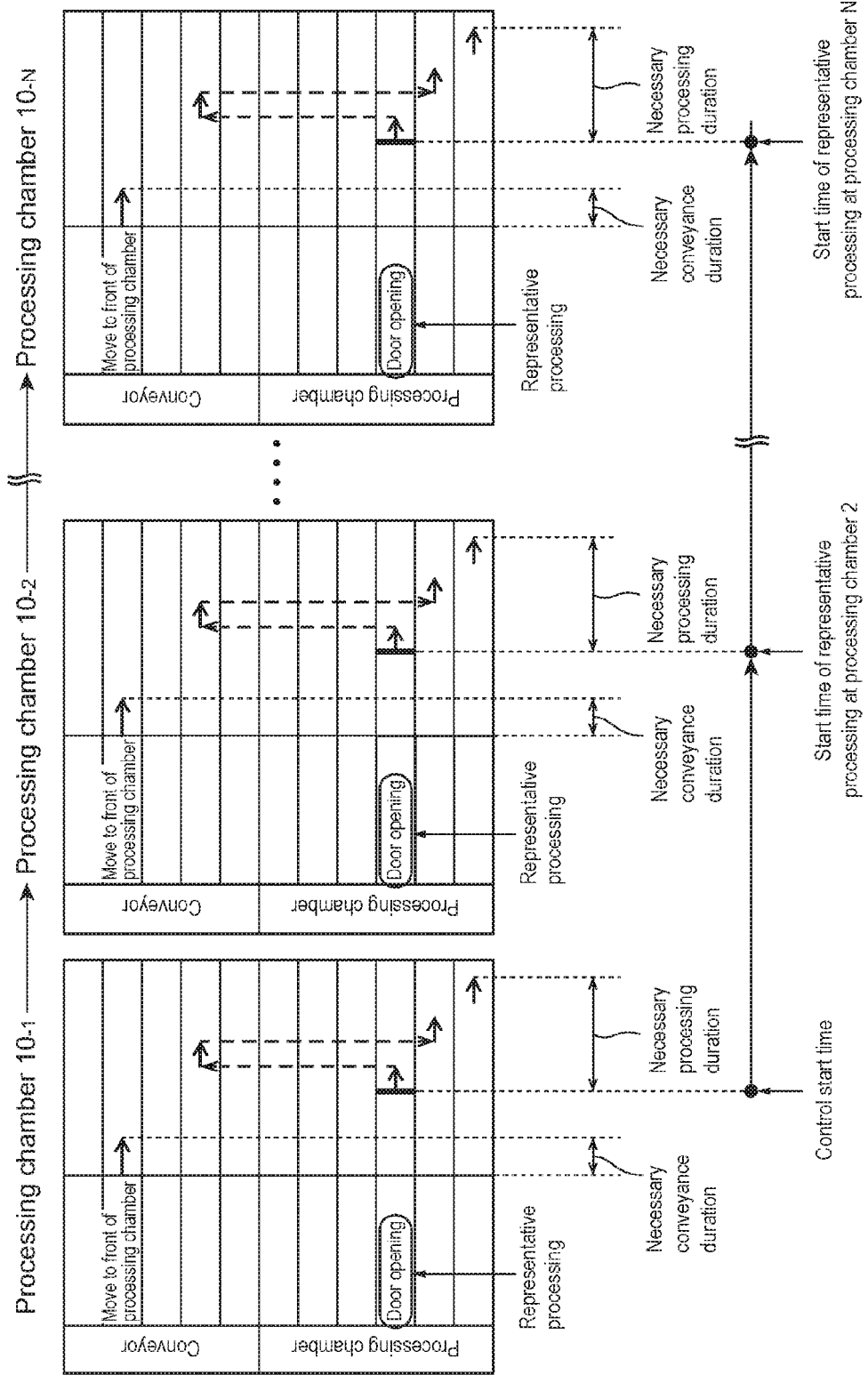
FIG. 8 includes the processing flows of the processing chambers arranged in line to describe the control performed therein.

Referring now to FIGS. 4 to 8, the following describes specific examples of the processing method of the present invention. FIG. 4 illustrates an example of the processing flow in one processing chamber, and FIGS. 5 to 7 schematically describe an example of the processing flow in the processing chamber in this order. FIG. 8 includes the processing flows of the processing chambers arranged in line to describe the control performed therein.

As illustrated in FIG. 4, the conveyor 20 moves to the processing chamber 10 and is docked thereto, and thereafter vacuuming of the conveyor 20 is performed.

Figure 5A:
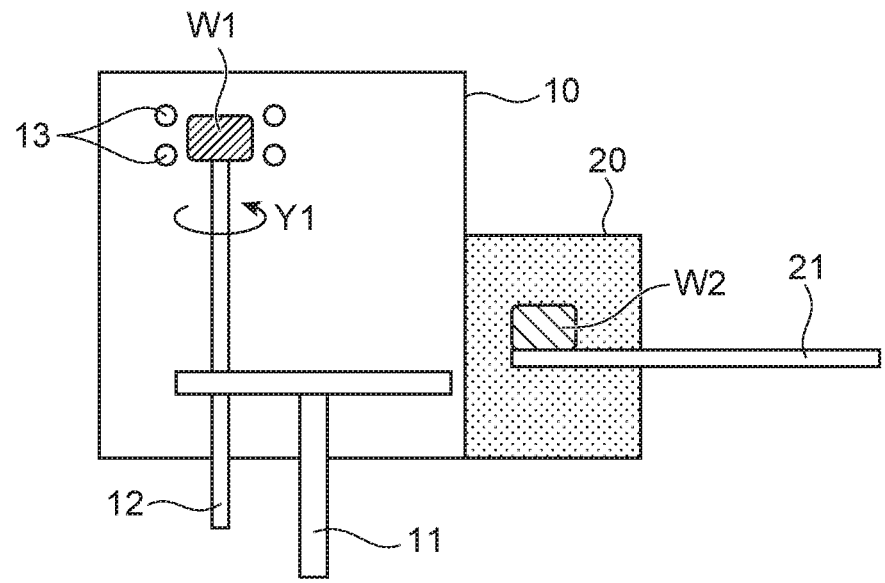
FIGS. 5A and 5B schematically describe an example of the processing flow in the processing chamber in the order of FIGS. 5A and 5B.

Specifically, as illustrated in FIG. 5A, the conveyor 20 shows a chamber structure, in which a fork 21 holds a workpiece W2.

Meanwhile the processing chamber 10 is internally provided with a delivery base 11 for workpieces, a rotating shaft 12 that holds a workpiece while rotating for heat treatment of the workpiece, and a heating coil 13 to heat the workpiece, and the interior of the processing chamber 10 is made to be vacuum atmosphere by a vacuum pump not illustrated.

In the processing chamber 10 in the vacuum atmosphere, a workpiece W1 that is already stored in the processing chamber 10 is rotated by the rotating shaft 12 that rotates (Y1 direction) and is heated by the heating coil 13. To such a processing chamber 10, the conveyor 20 storing the workpiece W2 to be processed next is docked, and is in a stand-by state.

Figure 5B:
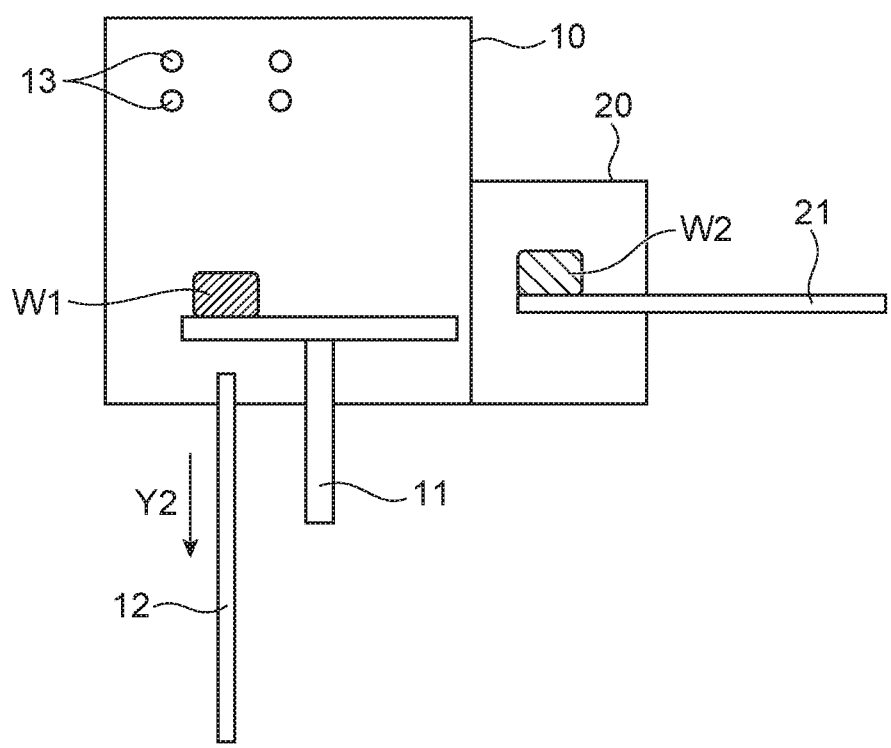

When heat treatment of the workpiece W1 in the processing chamber 10 ends, then as illustrated in FIG. 5B, the rotating shaft 12 descends (Y2 direction), and the workpiece W2 is delivered to the delivery base 11.

Figure 6A:
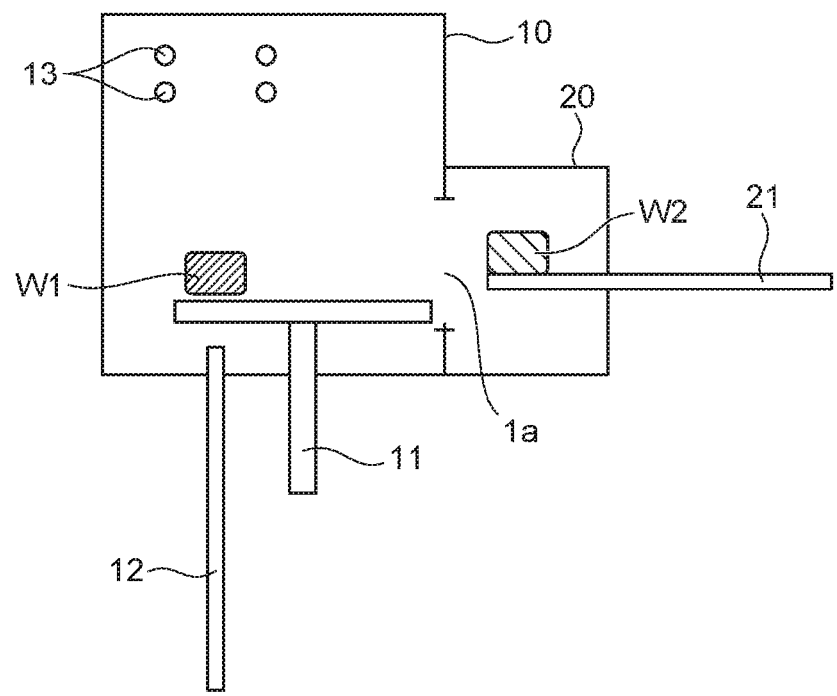
FIGS. 6A and 6B schematically describe, following FIGS. 5A and 5B, an example of the processing flow in the processing chamber in the order of FIGS. 6A and 6B.

When vacuuming in the conveyor 20 ends, then as illustrated in FIG. 6A, the door 1a of the processing chamber 10 opens. Opening of this door 1a is set as representative processing as the reference of the processing duration in the processing chamber 10.

Figure 6B:
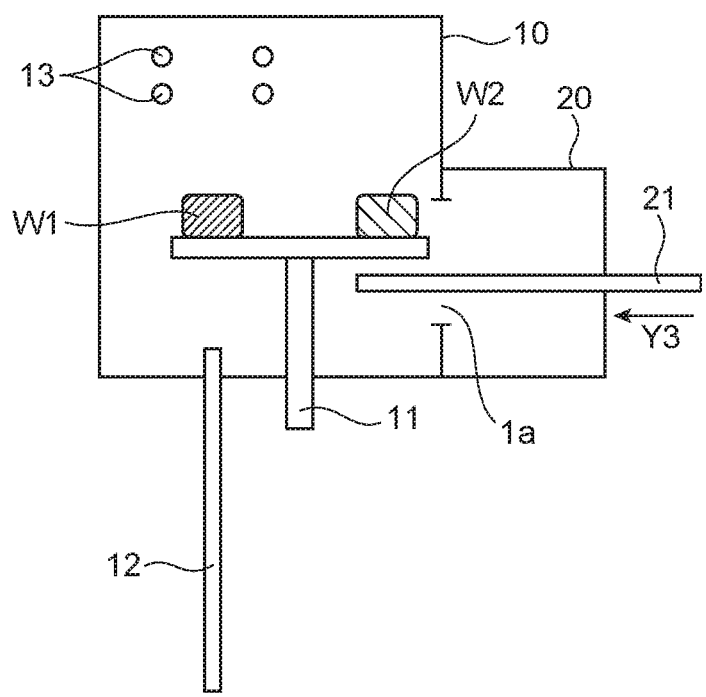

As illustrated in FIG. 6B, the fork 21 of the conveyor 20 is extended (Y3 direction) into the processing chamber 10 beyond the door 1a of the processing chamber 10 to load the workpiece W2 to be processed next, and the workpiece W2 loaded is delivered to the delivery base 11.

Next, as illustrated in FIG. 7A, the delivery base 11 rotates (Y4 direction), and the workpiece W1 after processing is delivered to the fork 21. Then the fork 21 moves backward (Y5 direction) into the conveyor 20, and the door 1a is closed.

As illustrated in FIG. 7B, in the processing chamber 10, the newly delivered workpiece W2 is held at the rotating shaft 12, and the rotating shaft 12 ascends (Y6 direction) while rotating (Y1 direction) for heating of the workpiece by the heating coil 13.

When heat treatment of the workpiece W2 ends, then the rotating shaft 12 descends, and the operation from FIG. 5B to FIG. 7B is repeated so that the workpiece W2 is stored in the conveyor 20. Then, the conveyor 20 moves to the following processing chamber 10.

A series of the operation of the processing chamber 10 and the conveyor 20 in FIGS. 5 through 7 is one example, and similar processing or different processing is performed in the other processing chambers 10. Such processing is repeated so that the workpiece can be processed as a finished product.

As illustrated in FIG. 8, opening of the door as the representative processing of the first processing chamber $10_{-1}$ is set as the control start time of the entire processing flow. For the second processing chamber $10_{-2}$, . . . the N-th processing chamber $10_{-N}$ as well, opening of the doors is set as the representative processing, and the door opening time of each processing chamber is set while considering the control start time as the origination, whereby the processing start time of each processing time that is originally set can be followed.

While certain embodiments of the present invention have been described in details with reference to the drawings, the specific configuration is not limited to the above-stated embodiments, and it should be understood that we intend to cover by the present invention design modifications without departing from the spirits of the present invention. For instance, in addition to the case of conveying a workpiece to the processing chambers in order, the present invention covers the case where a plurality of processing chambers for time-consuming heat treatment steps are disposed in parallel, and the same processing is performed in parallel as well.

DESCRIPTION OF SYMBOLS

10 Processing chamber
$10_{-1}$ Processing chamber (first processing chamber)
$10_{-2}$, $10_{-N}$ Processing chamber
1a, 2a, Na Door
1b, 2b, Nb Sensor
20 Conveyor
30 Control device
100 Processing system
W1, W2 Workpiece

What is claimed is:

1. A workpiece processing system comprising:
   a plurality of processing chambers each of which performs processing of a workpiece in accordance with a predetermined order;
   a conveyor that conveys a workpiece subjected to processing at a predetermined processing chamber to a next processing chamber; and
   a control device that controls at least start time of predetermined representative processing among various types of processing performed at each processing chamber, wherein
   the control device sets predetermined representative processing at a first processing chamber that performs first processing as a reference processing step, sets start time of the reference processing step as control start time, sets necessary processing duration specific to each processing chamber, sets necessary conveyance duration required to convey a workpiece between the processing chambers, and controls starting of the representative processing at each processing chamber while considering the control start time as origination, wherein
   the necessary processing duration is a maximum duration including a variation in duration required for processing at a processing chamber among durations required for the processing at the processing chamber;
   the control device monitors whether, at start time of the representative processing of each processing chamber, the representative processing can be performed or not, and
   when the control device determines that the representative processing cannot be performed, the control device transmits, to a warning device, an instruction to output abnormality warning.

* * * * *